(12) United States Patent
Yu

(10) Patent No.: US 7,548,006 B2
(45) Date of Patent: Jun. 16, 2009

(54) MOTOR MAGNET FIXING DEVICE

(76) Inventor: Tang Yung Yu, No. 378-3. Sec. 3 Shen Yung Road, Taichung (TW)

(*) Notice: Subject to any disclaimer, the term of this patent is extended or adjusted under 35 U.S.C. 154(b) by 282 days.

(21) Appl. No.: 11/654,032

(22) Filed: Jan. 17, 2007

(65) Prior Publication Data

US 2008/0169719 A1     Jul. 17, 2008

(51) Int. Cl.
*H02K 21/12* (2006.01)
(52) U.S. Cl. .............................. 310/156.12; 310/156.22
(58) Field of Classification Search ............ 310/154.03, 310/154.05, 154.09, 156.08, 156.12, 156.13, 310/156.14, 156.18, 156.19, 156.22, 261, 310/267
See application file for complete search history.

(56) References Cited

U.S. PATENT DOCUMENTS

| | | | | |
|---|---|---|---|---|
| 4,012,651 A | * | 3/1977 | Burson | ........................ 310/153 |
| 4,219,752 A | * | 8/1980 | Katou | .................... 310/156.19 |
| 4,814,651 A | * | 3/1989 | Elris et al. | ..................... 310/88 |
| 5,111,094 A | * | 5/1992 | Patel et al. | ............. 310/156.22 |
| 5,675,204 A | * | 10/1997 | Kusumoto et al. | ...... 310/154.17 |
| 5,998,902 A | * | 12/1999 | Sleder et al. | ................. 310/153 |
| 6,075,301 A | * | 6/2000 | Shinoda | .................. 310/154.17 |
| 2006/0017342 A1 | * | 1/2006 | Park | ....................... 310/156.19 |

* cited by examiner

*Primary Examiner*—Tran N Nguyen
(74) *Attorney, Agent, or Firm*—Ming Chow; Sinorica, LLC

(57) ABSTRACT

A motor magnet fixing device includes two press rings, a plurality of magnets and locking members. A least one of the two press rings has its annular surface disposed with a plurality of projecting members spaced apart equidistantly. Each projecting member is axially bored with a fixing hole, having its opposite sides respectively formed with an engage recess. The magnets are clamped between the two press rings and respectively engaged between the adjacent projecting members of the two press rings. Each magnet has its opposite ends respectively formed with an engage projection to be engaged in the engage recesses of the projecting members of the press rings. The locking members are respectively inserted in the fixing holes of the projecting members of the press rings to combine the press rings together and fix the magnets between the press rings.

9 Claims, 7 Drawing Sheets

MOTOR MAGNET FIXING DEVICE

BACKGROUND OF THE INVENTION

1. Field of the Invention

This invention relates to a motor magnet fixing device, particularly to one provided with two press rings and a plurality of locking members to have motor magnets clamped firmly between the two press rings, able to fix the motor magnets in position and facilitate its assembly.

2. Description of the Prior Art

Generally, a conventional motor magnet fixing device is provided with plural magnets preset in number to be equidistantly secured on the inner wall of a motor housing by means of adhesives, and a rotor installed in the interior of the motor housing to be actuated to rotate and produce electric force by change of the magnetic line of force and the magnetic field of the magnets. However, the adhesives may become weakened in its viscosity after used for a long period of time, rendering the magnets likely to fall off and causing damage to the motor. In addition, when glued on the inner wall of the motor housing, the magnets, due to mutual attraction and repelling of magnetic polarity, are likely to move bias and hard to be precisely fixed in position. As a result, it is inconvenient to assemble the magnets and impossible to separate and arrange the magnets equidistantly with precise intervals, thus failing to make magnetic action of the magnets distributed evenly and unable let the motor operate stably.

Another conventional motor magnet fixing device devised by the inventor of this invention, as shown in FIG. 1, includes a motor housing 10, plural magnets 11 preset in number, two positioning rings 12 and plural bolts 13 combined together. The motor housing 10 is a long cylindrical hollow one, and the magnets 11 are respectively shaped as a long arcuate plate matching with the curvature of the inner wall of the motor housing 10 so that the magnets 11 can directly be fixed on the inner wall of the motor housing 10 by their attractive force. The two positioning rings 12 have their circumferential edges respectively bent inward to form a protruding rim 121 for engaging and positioning the opposite ends of the magnets 11 and their annular surfaces respectively bored with four insert holes 122 spaced apart equidistantly. Each insert hole 122 of the two positioning rings 12 has its opposite sides respectively extending downward to form a projecting edge 123 for engaging part of the end corners of the magnet 11. The bolts 13 are respectively inserted through the insert holes 122 of the two opposite positioning rings 12 and locked with a nut 131, letting the magnets 11 firmly fixed inside the motor housing 10 by the two positioning rings 12.

However, due to the attracting and repelling action of magnetic polarity, when the magnets 11 are assembled on the opposite inner walls of the motor housing 10 by means of the two positioning rings 12, it will always cause trouble in operation, and when the bolts 13 are respectively inserted through the insert hole 122 and the gaps between two magnets 11 and locked with the nut 131, the bolts 13 will be actuated to sway bias by the magnetic action of the magnets 11 and hard to be fixed in position quickly and precisely, resulting in difficulty and inconvenience in assembly and operation.

SUMMARY OF THE INVENTION

The objective of this invention is to offer a motor magnet fixing device composed of at least two press rings, a plurality of magnets preset in number and plural locking members. At least one of the two press rings has its annular surface disposed thereon with a plurality of projecting members spaced apart equidistantly. Each projecting member is axially bored with a fixing hole and has its opposite sides respectively formed with an engage recess. The magnets are firmly sandwiched between the two press rings and respectively engaged between the adjacent projecting members of the two press rings. Each magnet has its opposite sides respectively formed with an engage projection to be respectively engaged in the adjacent engage notches of the projecting members of the two press rings. The locking members are respectively inserted in the fixing holes of the projecting members of the two press rings to combine the two press rings together, letting the magnets firmly clamped between the two press rings. Thus, each magnet has its opposite engage projections engaged and restrictedly positioned in the engage notches of the adjacent projecting members of the two press rings; therefore, the magnetic action of the magnets can evenly be distributed within the two press rings, able to stabilize the magnetic polarity of the magnets. In addition, the two press rings are made of plastic; therefore, when the locking members are respectively inserted in the fixing holes of the projecting members of the two press rings for combining the two press rings together and securing the magnets between the two press rings, the locking members can be quickly guided and inserted in the fixing holes. Additionally, since the locking members are separated from the magnets by parts of the plastic press rings, they will not be affected by the magnetic action of the magnets and hence can be easily assembled in the two press rings, possible to cut short the time required in production and elevate market competitive capability.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
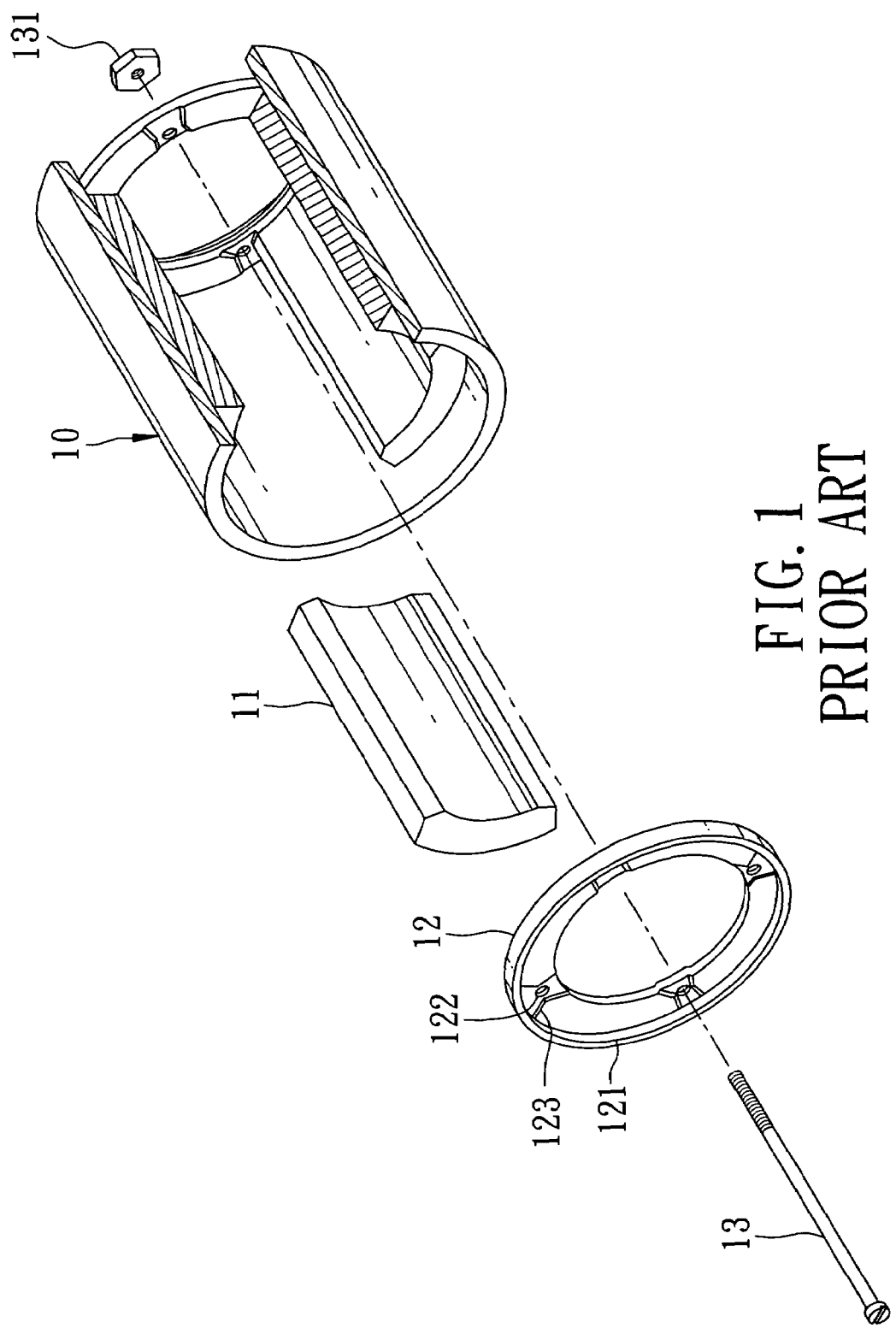
FIG. 1 is an exploded perspective view of a conventional motor magnet fixing device.
Figure 2:
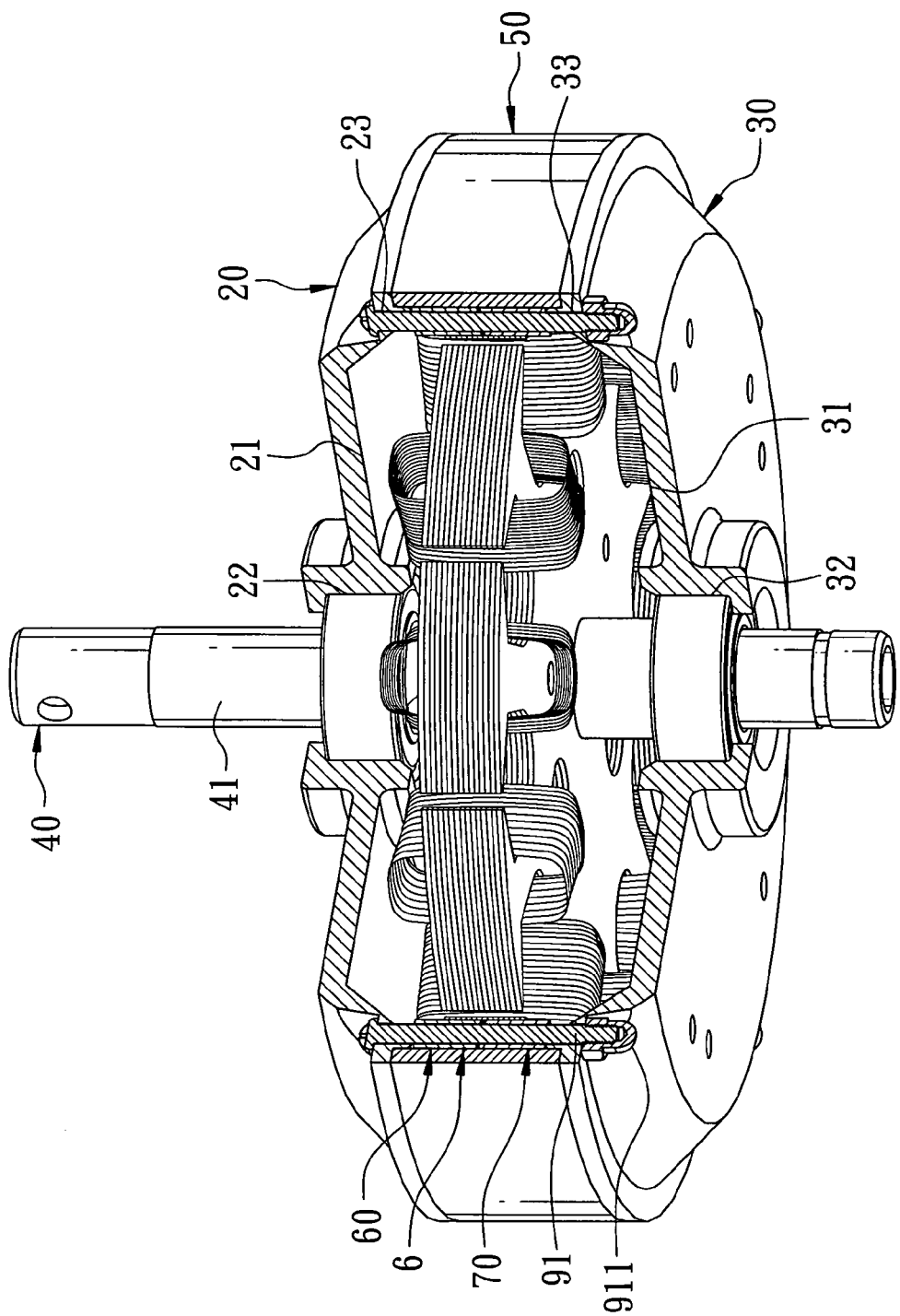
FIG. 2 is a side cross-sectional view of a first preferred embodiment of a motor magnet fixing device in the present invention.
Figure 3:
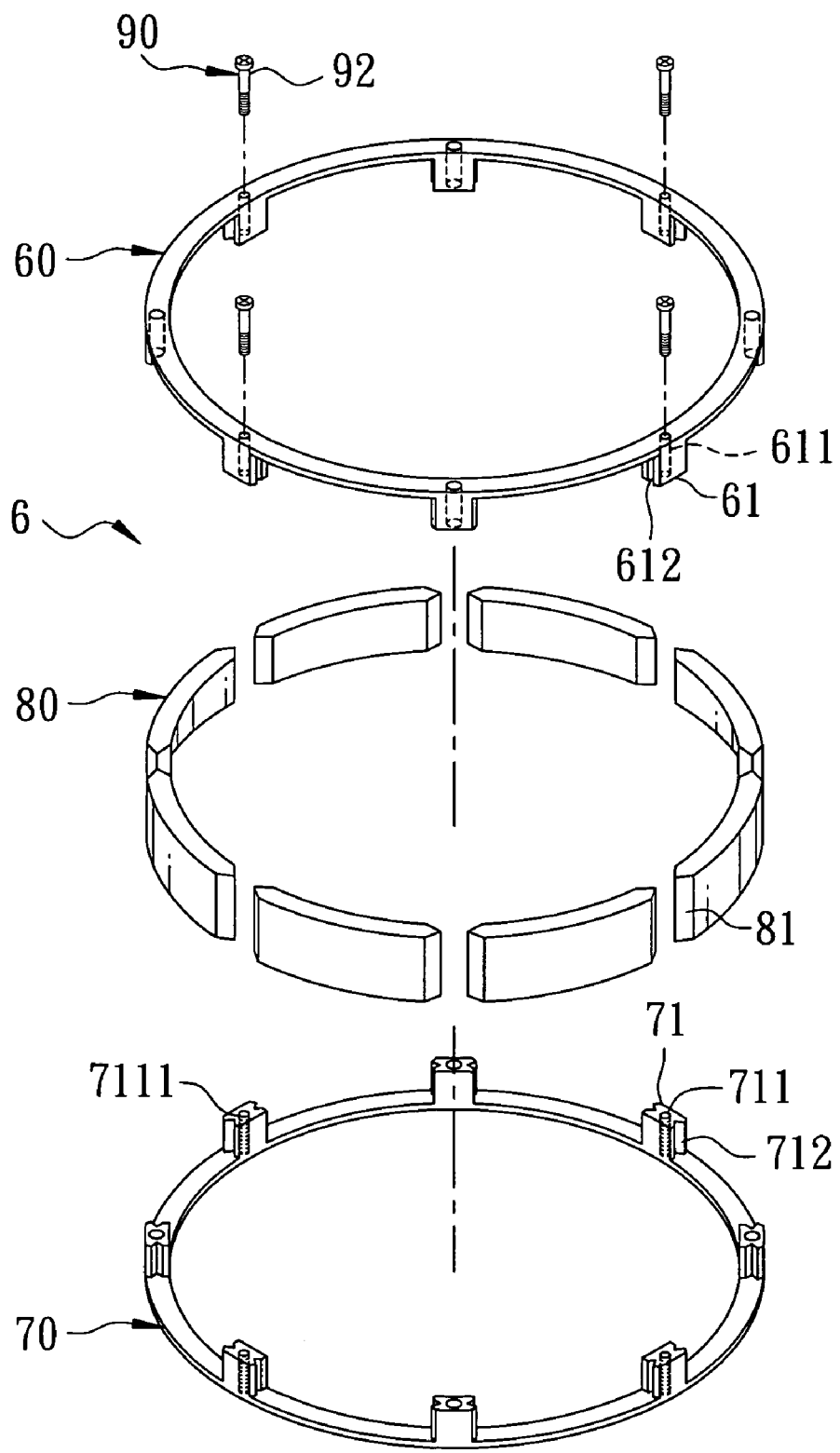
FIG. 3 is a partial exploded perspective view of the first preferred embodiment of the motor magnet fixing device in the present invention.
Figure 4:
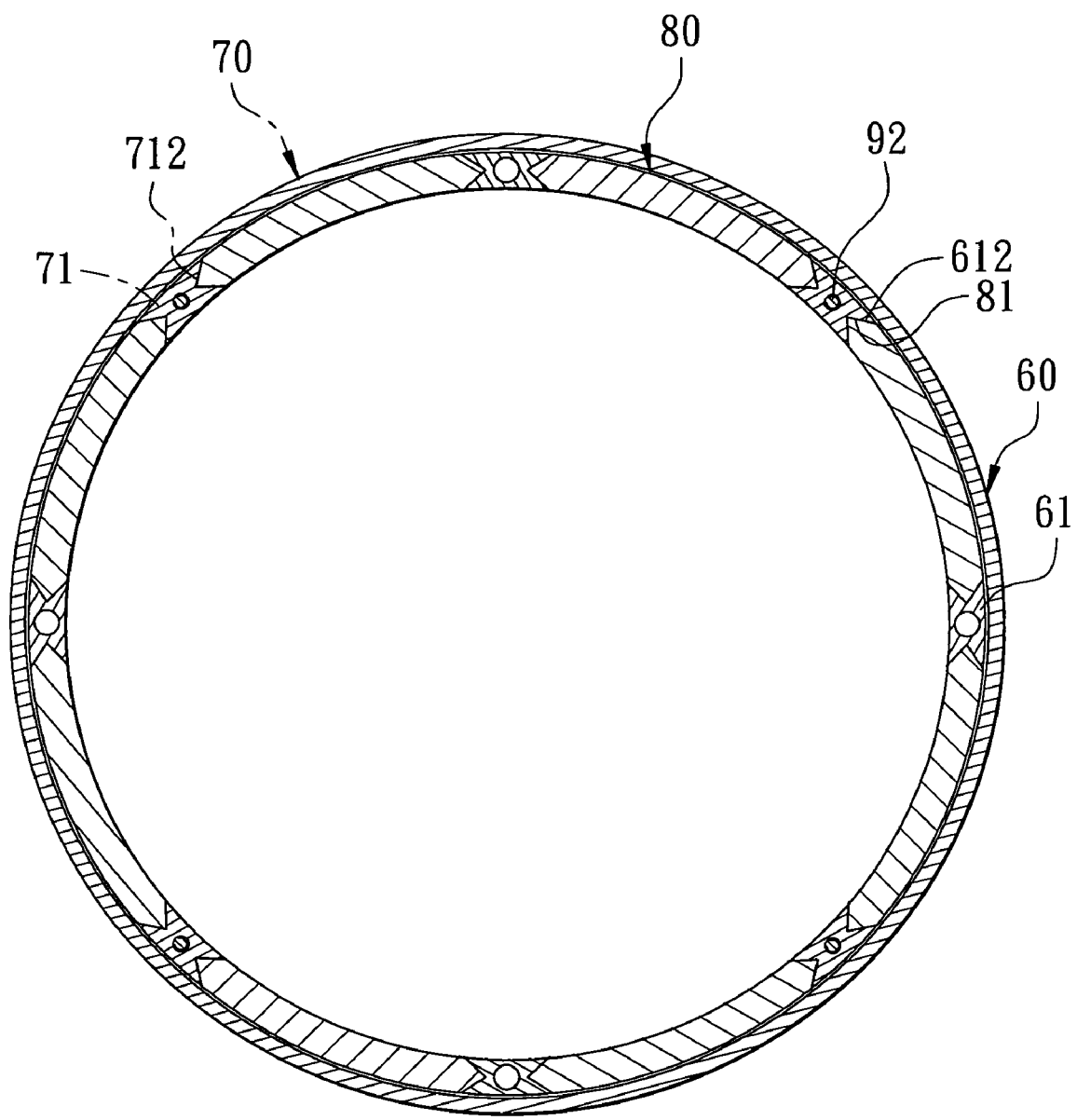
FIG. 4 is a partial cross-sectional view of the first preferred embodiment of the motor magnet fixing device in the present invention.
Figure 5:
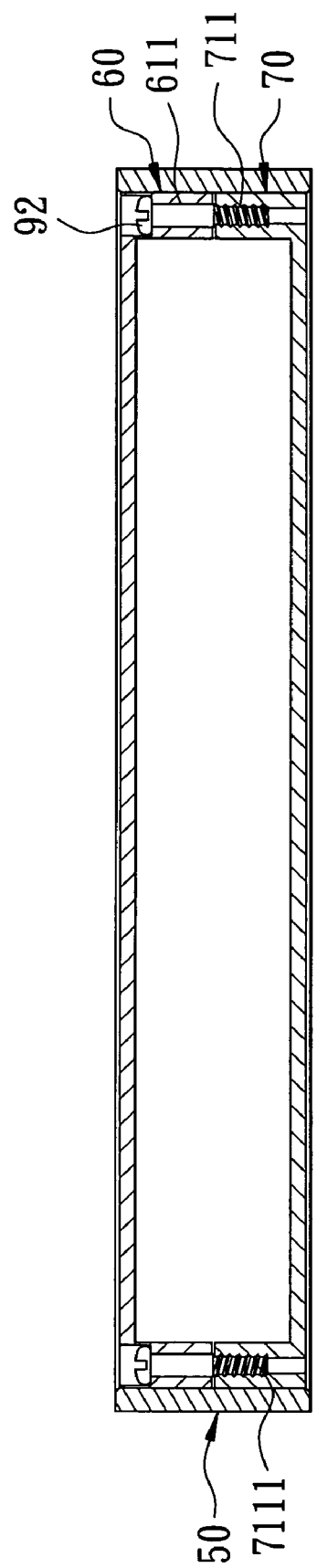
FIG. 5 is a partial side cross-sectional view of the first preferred embodiment of the motor magnet fixing device in the present invention.

A first preferred embodiment of a motor magnet fixing device in the present invention, as shown in FIGS. 2 and 3, includes an upper motor housing 20, a lower motor housing 30, a rotor 40, an intermediate ring 50 and a magnet fixing device 6 combined together.

The upper motor housing 20 is shaped as a circular disc having one side provided with a combining member 21 and its central portion bored with a combining hole 22 and also having its annular edge bored with a plurality of insert holes 23 spaced apart at a preset interval.

The lower motor housing 30 shaped as a circular disc corresponding with the upper motor housing 20 is provided with a combining member 31 at one side facing the upper motor housing 20 and bored in the center with a combining hole 32 aligned to the combining hole 22 of the upper motor housing 20. The lower motor housing 30 further has its annular edge bore-d with a plurality of insert holes 33 respectively aligned to the insert holes 23 of the upper motor housing 20.

The rotor 40 to be axially and pivotally assembled at one side of the combining member 21 of the upper motor housing 20 has its central opposite sides respectively disposed with an axial combining shaft 41 to be respectively inserted through the combining hole 22 and 32 of the upper and the lower motor housing 20 and 30 for positioning the rotor 40 in between the upper and the lower motor housing 20 and 30.

The intermediate ring 50 is a cylindrical hollow body to be assembled between the annular edges of the combining member 21, 31 of the upper and the lower motor housing 20, 30.

The magnet fixing device 6 to be firmly fixed on the inner annular wall of the upper and the lower motor housing 20 and 30 and positioned around the rotor 40 is composed of an upper press ring 60, a lower press ring 70, a plurality of magnets 80 preset in number and plural locking members 90.

The upper press ring 60 is a circular hollow-body made of insulating plastic, having its lower annular surface disposed with a plurality of projecting members 61 spaced apart equidistantly. Each projecting member 61 is axially bored with a fixing hole 611 and has its opposite sides respectively bored with a V-shaped engage recess 612.

The lower press ring 70 made of plastic and having the same shape as the upper press ring 60 has its upper annular surface fixed with a plurality of projecting members 71 respectively aligned to the projecting members, 61 of the upper press ring 60. Each projecting member 71 is axially bored with a fixing hole 711 aligned to the fixing hole 611 of the upper press ring 60 and formed with female threads 7111. Further, each projecting member 71 has its opposite sides respectively formed with a V-shaped engage recess 712 corresponding with the V-shaped engage recess 612 of the upper press ring 60.

The magnets 8 are to be sandwiched between the upper and the lower press ring 60 and 70 and respectively assembled between the adjacent projecting members 61 and 71 of the upper and the lower press ring 60 and 70. Each magnet 8 has its opposite ends respectively formed into a V-shaped engage projection 81 to be engaged in the V-shaped engage recesses 612 and 712 of the adjacent projecting members 61 and 71 of the upper and the lower press ring 60 and 70, letting the magnets 80 fixed in position by the upper and the lower press ring 60 and 70.

The locking members 90 consist of four bolts 91 and four self-tapping bolts 92, which are intermittently positioned with one another to be respectively inserted in the fixing holes 611 and 711 of the projecting members 61 and 71 of the upper and the lower press ring 60 and 70. The four bolts 91 are respectively inserted through the insert holes 23 and 33 of the upper and the lower motor housing 20 and 30 for combining the upper and the lower motor housing 20 and 30 together, while the four self-tapping bolts 92 are respectively inserted in the fixing holes 611 and 711 of the upper and the lower press ring 60 and 70 to combine the upper and the lower press ring 60 and 70 together, letting the magnets 80 firmly clamped between the upper and the lower press ring 60 and 70.

In assembling, referring to FIGS. 2-5, firstly, all the magnet 80 respectively have the V-shaped engage projections 81 at the opposite ends respectively engaged in the V-shaped engage recesses 612 and 712 of the adjacent projecting members 61, 71 of the upper and the lower press ring 60 and 70, letting the magnets 80 engaged and restrictedly positioned between the upper and the lower press ring 60 and 70. Next, the four self-tapping bolts 92 are respectively inserted through the fixing holes 611 of the projecting members 61 from the upper side of the upper press ring 60 and then locked in the fixing holes 711 of the projecting members 71 of the lower press ring 70 to combine the upper and the lower press ring 60 and 70 together. Subsequently, the upper press ring 60, the magnets 80 and the lower press ring 70, after assembled together, are deposited in the interior of the intermediate ring 50 on the combining member 31 of the lower motor housing 30. Afterward, the rotor 40 has its lower combining shaft 41 inserted through the combining hole 32 of the lower motor housing 30, letting the rotor 40 positioned at the upper side of the upper press ring 60, and then the upper motor housing 20 has its combining hole 22 fitted around the upper combining shaft 41 of the rotor 40 to assemble the upper motor housing 20 at the upper side of the rotor 40, letting the rotor 40 positioned between the upper and the lower motor housing 20 and 30. Lastly, the four bolts 91 are respectively inserted from above to pass through the insert holes 23 of the upper motor housing 20, the fixing holes 611 and 711 of the projecting members 61 and 71 of the upper and the lower press ring 60, 70 and the insert holes 33 of the lower motor housing 30 and then locked with nuts 911 at the underside of the lower motor housing 30 to fixedly combine the upper and the lower motor housing 20 and 30 together.

Figure 6:
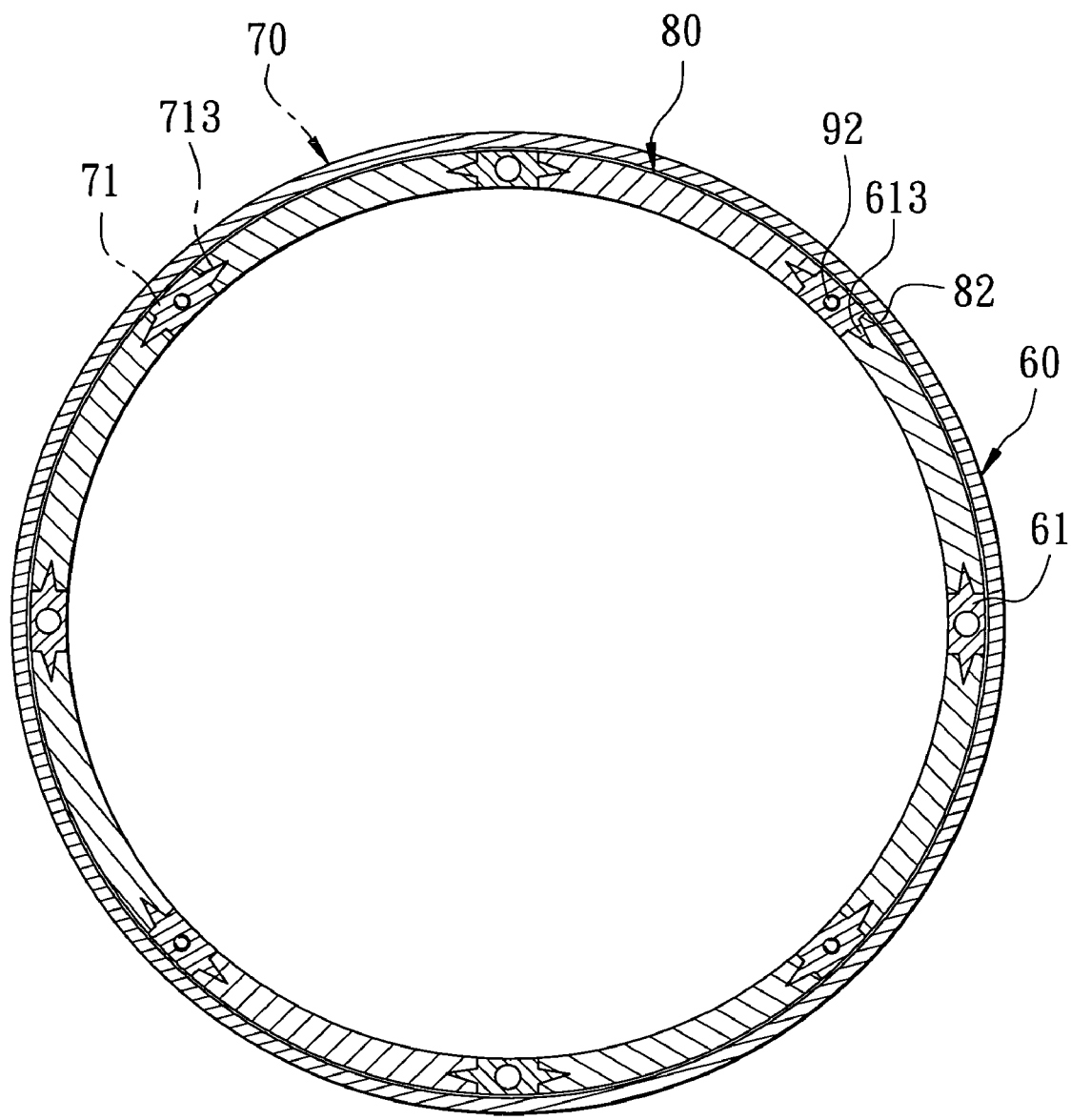
FIG. 6 is a partial cross-sectional view of a second preferred embodiment of a motor magnet fixing device in the present invention.

A second preferred embodiment of a motor magnet fixing device in the present invention, as shown in FIG. 6, has almost the same structure as that described in the first preferred embodiment, except that each projecting member 61 and 71 of the upper and the lower press ring 60 and 70 has its opposite sides respectively formed with a longitudinal V-shaped engage projection 613 and 713, while each magnet 80 has its opposite ends respectively bored with a V-shaped engage recess 82 to be respectively engaged with the V-shaped engage projections 613 and 713 of the upper and the lower press ring 60 and 70. Thus, the magnets 80 can be restrictedly positioned between the upper and the lower press ring 60 and 70. In addition, the engage recesses 82 of each magnet 80 and the engage projections 613 and 713 of each projecting member 61 and 71 of the upper and the lower press ring 60 and 70 could also be shaped as a U, a T or a dove-tail, equally able to firmly fix the magnets 80 between the upper and the lower press ring 60 and 70.

Figure 7:
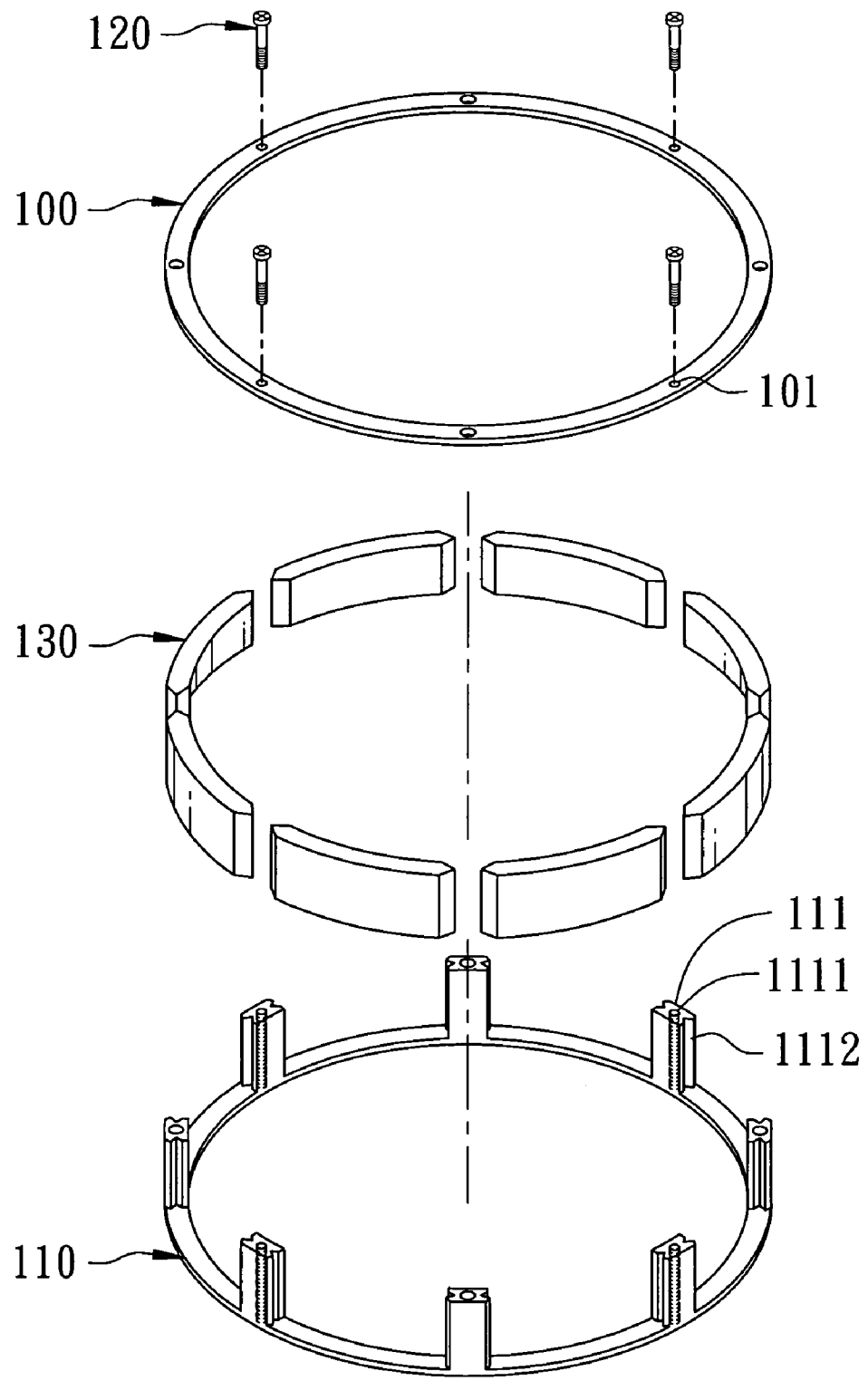
FIG. 7 is a partial exploded perspective view of a third preferred embodiment of a motor magnet fixing device in the present invention.

A third preferred embodiment of a motor magnet fixing device in the present invention, as shown in FIG. 7, includes an upper press ring 100, a lower press ring 110, a plurality of magnets 130 preset in number and plural locking rivets 120 combined together. The lower press ring 110 is a circular hollow ring having its upper annular surface secured with a plurality of projecting members 111 spaced apart equidistantly, and each projecting member 111 is axially bored with a fixing hole 1111 and has its opposite sides respectively cut with an engage recess 1112. The upper press ring 100 is a circular hollow ring having its annular surface bored with a plurality of fixing holes 101 respectively aligned to the fixing holes 1111 of the lower press ring 110. Locking rivets 120 are respectively inserted through the fixing holes 101 of the upper press ring 100 and locked in the fixing holes 1111 of the lower press ring 110 to combine the upper and the lower press ring 100 and 110 together, letting the magnets 130 clamped in position between the upper and the lower press ring 100 and 101.

As can be understood from the above description, this invention has the following advantages.

1. Each magnet has its opposite engage projections respectively engaged and restrictedly positioned in the opposite engage recesses of the adjacent projecting members of the upper and the lower press ring; therefore, the magnetic action of the magnets can be distributed evenly within the two press rings, able to stabilize the magnetic polarity of the magnets.

2. The two press rings are made of plastic; therefore, when the motor magnet fixing device is assembled, the locking members are easy to be guided and inserted in the fixing holes of the projecting members of the two press rings. In addition, the lock members and the magnets are separated from each other by parts of the plastic press ring; therefore, the locking member will be free from the magnetic action of the magnet and hence easy to be assembled in the interior of the two press rings, and able to speed up production and enhance market competitive capability.

While the preferred embodiments of the invention have been described above, it will be recognized and understood that various modifications may be made therein and the appended claims are intended to cover all such modifications that may fall within the spirit and scope of the invention.

I claim:

1. A motor magnet fixing device assembled on the inner annular wall of a motor housing, said motor magnet fixing device positioned around the rotor of a motor, said motor magnet fixing device comprising two press rings, including a first press ring and a second press ring, plural magnets preset in number and plural locking members:

said two press rings respectively formed with a hollow-shaped ring, at least one of said two press rings having its annular surface disposed thereon with a plurality of projecting members spaced apart equidistantly, each said projecting member axially bored with a fixing hole, each said projecting member having its opposite sides respectively formed with an engage portion, said second press ring having its annular surface bored with a plurality of fixing holes respectively aligned to said fixing holes of said first press ring;

said magnets clamped between said two press rings and respectively engaged between the adjacent two of said projecting members of said two press rings, each said magnet having its opposite ends respectively formed with an engage portion, said engage portions of each said magnet respectively engaged with said engage portions of the adjacent two of said projecting members of said two press rings; and said locking members respectively inserted into said fixing holes of said projecting members of said two press rings, said two press rings combined together by means of said locking members, said magnets firmly clamped in position between said two press rings.

2. The motor magnet fixing device as claimed in claim 1, wherein said two press rings, inclusive of an upper press ring and a lower press ring, respectively have an annular surface fixed thereon with a plurality of projecting members spaced apart equidistantly, each said projecting member axially bored with a fixing hole, each said projecting member having its opposite sides respectively formed with an engage portion.

3. The motor magnet fixing device as claimed in claim 1, wherein said engage portions at the opposite ends of each said magnet are V-shaped projections, while said engage portions at the opposite sides of each projecting member of said press ring are V-shaped recesses.

4. The motor magnet fixing device as claimed in claim 1, wherein said engage portions of each said magnet are V-shaped recesses, while said engage portions of each said projecting member are V-shaped.

5. The motor magnet fixing device as claimed in claim 1, wherein said engage portions of each said magnet are U-shaped, T-shaped or dove tail-shaped projections, while said engage portions of each said projecting member are U-shaped, T-shaped or dove tail-shaped recesses.

6. The motor magnet fixing device as claimed in claim 1, wherein said locking members are self-tapping bolts.

7. The motor magnet fixing device as claimed in claim 1, wherein said locking members are rivets.

8. The motor magnet fixing device as claimed in claim 1, wherein said motor housing is composed of two corresponding motor housings, said two motor housings respectively assembled on said upper press ring and under said lower press ring, said two motor housings respectively provided with a combining member at one side facing the upper and the lower press ring, said two press rings respectively combined with said combining members of said two motor housings and said magnets positioned in the interior of said motor housing.

9. The motor magnet fixing device as claimed in claim 1, wherein said motor housing is composed of an upper motor housing and a lower motor housing, a rotor installed at one side of said combining member of said upper motor housing, said rotor having its central opposite sides respectively disposed with an upper combining shaft and a lower combining shaft, said upper and said lower motor housing respectively bored with a combining hole at the corresponding locations of said two combining shafts of said rotor, said upper and said lower combining shafts of said rotor respectively inserted through said two combining holes of said upper and said lower motor housing to assemble said rotor between said upper and said lower motor housing, an intermediate ring secured on an upper annular edge of said combining member of said lower motor housing, said intermediate ring firmly positioned between said press ring and said lower motor housing.

* * * * *